(12) United States Patent
Hashimoto et al.

(10) Patent No.: US 6,197,251 B1
(45) Date of Patent: Mar. 6, 2001

(54) POROUS METAL MATERIAL, AND METHOD FOR MANUFACTURING SAME

(75) Inventors: Akira Hashimoto, Sakai; Junjirou Awano, Hirakata; Katsuhiro Okamoto, Toyohashi; Tsumoru Ohata, Kyoto; Yoriko Takai, Toyonaka; Masaki Hirokoh, Kobe, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/029,413

(22) PCT Filed: Jul. 29, 1997

(86) PCT No.: PCT/JP97/02612

§ 371 Date: Feb. 26, 1998

§ 102(e) Date: Feb. 26, 1998

(87) PCT Pub. No.: WO98/04374

PCT Pub. Date: Feb. 5, 1998

(30) Foreign Application Priority Data

| Jul. 29, 1996 | (JP) | 8-198859 |
|---|---|---|
| Nov. 5, 1996 | (JP) | 8-292342 |
| Nov. 5, 1996 | (JP) | 8-292343 |
| Nov. 14, 1996 | (JP) | 8-302764 |

(51) Int. Cl.[7] .............................. B22F 7/04; H01M 4/80
(52) U.S. Cl. ................... 419/2; 419/9; 419/24; 29/2
(58) Field of Search .................. 428/605, 608, 428/614, 680, 611; 419/24, 2, 4, 8, 5, 9; 228/178, 203, 185; 29/2

(56) References Cited

U.S. PATENT DOCUMENTS

| 3,819,413 | * | 6/1974 | Nippe et al. ..................... 136/25 |
| 4,358,699 | * | 11/1982 | Wilsdorf ........................ 310/251 |
| 4,595,637 | * | 6/1986 | Eaton et al. .................... 428/608 |
| 4,672,009 | | 6/1987 | Takahashi ...................... 428/694 |
| 4,729,871 | | 3/1988 | Morimoto ........................ 419/2 |
| 5,840,444 | * | 11/1998 | Takeshima et al. ............... 429/223 |

FOREIGN PATENT DOCUMENTS

| 3904743 | 8/1990 | (DE) . |
| 56-37664 | 9/1981 | (JP) . |
| 56-40465 | 9/1981 | (JP) . |
| 57-5015 | 1/1982 | (JP) . |
| 57-12264 | 3/1982 | (JP) . |
| 57-39317 | 8/1982 | (JP) . |
| 62-35457 | 2/1987 | (JP) . |
| 63-270403 | 11/1988 | (JP) . |
| 4-165006 | 6/1992 | (JP) . |
| 745285 | 2/1995 | (JP) . |
| 8-298124 | 11/1996 | (JP) . |
| 9-265991 | 10/1997 | (JP) . |

* cited by examiner

Primary Examiner—John J. Zimmerman
(74) Attorney, Agent, or Firm—Jordan and Hamburg LLP

(57) ABSTRACT

A porous metal material (22) is manufactured by a method comprising a step of utilizing a magnetic field to orient numerous metal staple fibers (3), and holding these metal staple fibers (3) on the metal substrate sheet (9) in a state of being more or less perpendicular thereto by means of an adhesive (19) supplied to the metal substrate sheet (9), and a step of removing the adhesive (19) by pyrolysis, and integrally joining the metal staple fibers (3) and metal substrate sheet (9) by sintering.

17 Claims, 16 Drawing Sheets

Fig. 1
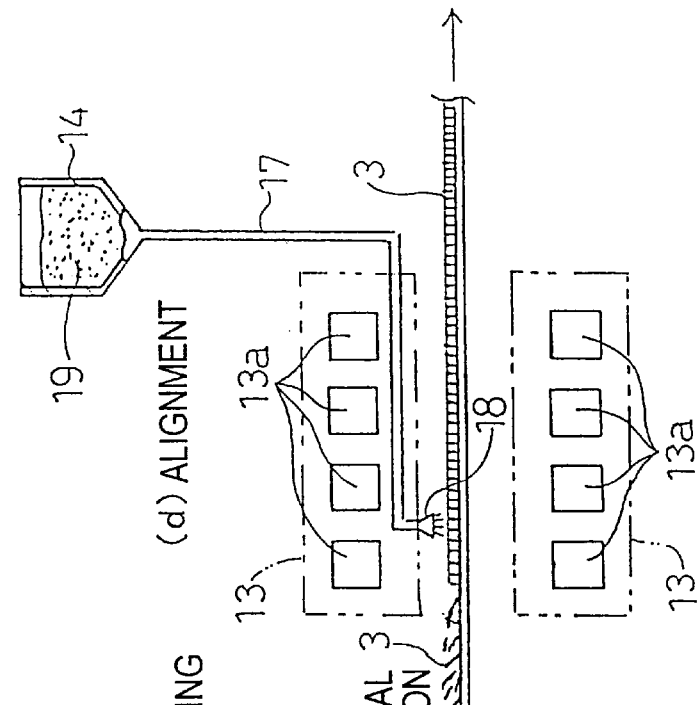
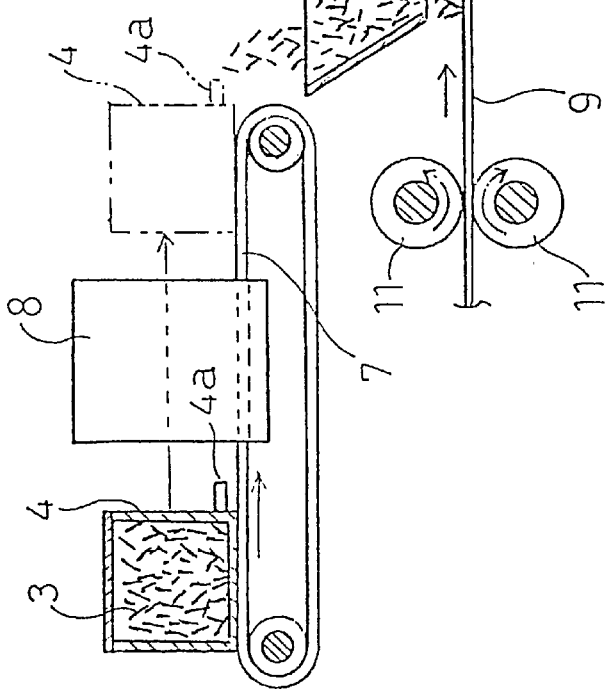

Fig. 2
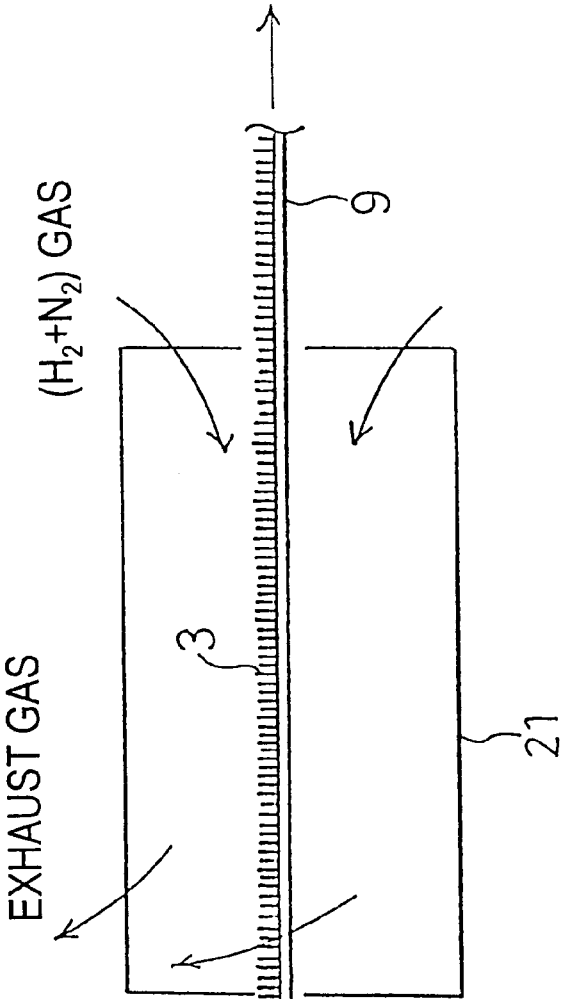
(g) REDUCTION
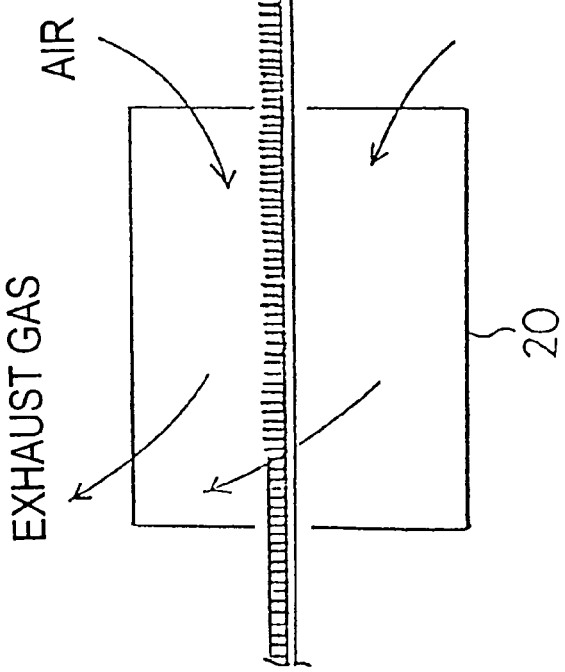
(f) HEATING

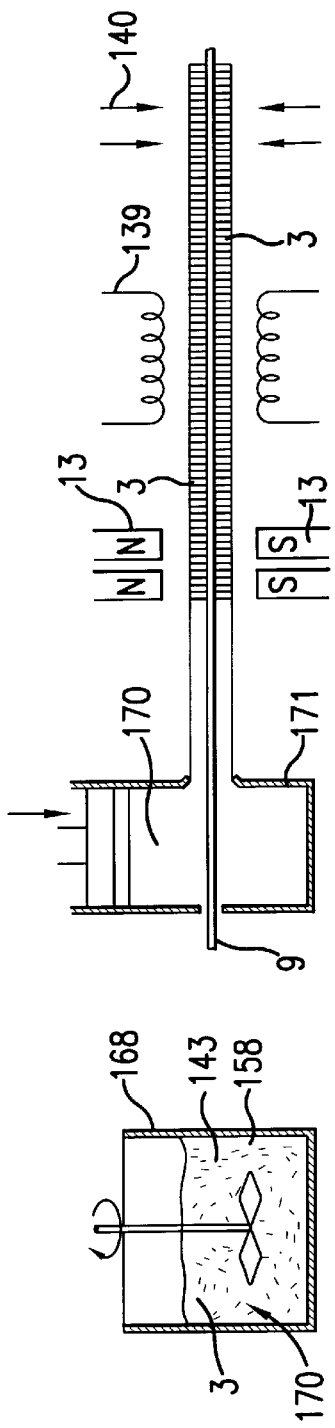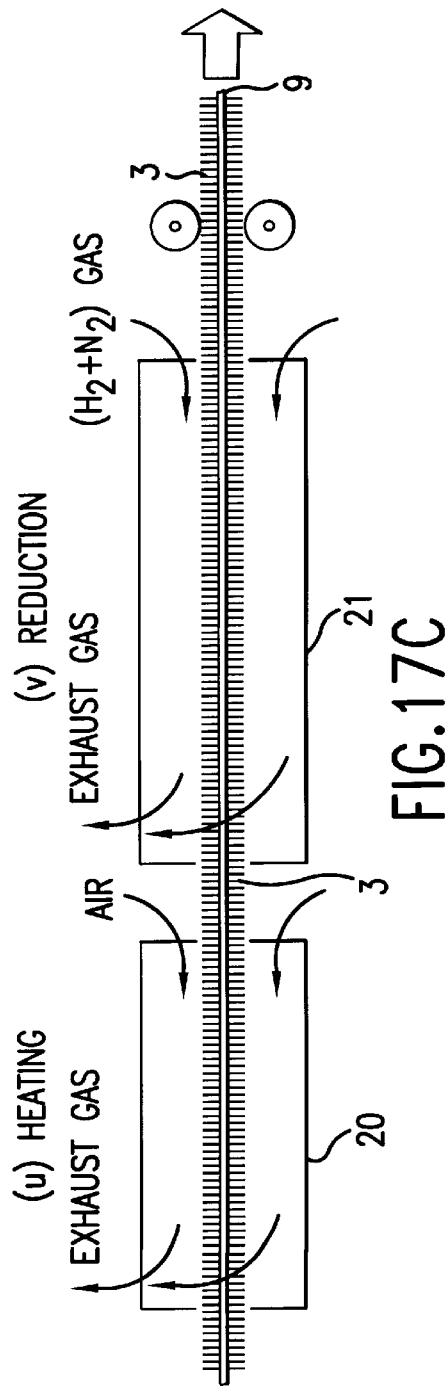

POROUS METAL MATERIAL, AND METHOD FOR MANUFACTURING SAME

TECHNICAL FIELD

This invention relates to a porous metal material that can be used favorably as the core of an electrode sheet in a secondary cell, such as a lithium ion secondary cell, a nickel-hydrogen storage cell, or a nickel-cadmium cell, and to a method for manufacturing this porous metal material.

BACKGROUND ART

Porous metal materials are widely used in mechanical parts and various other industrial fields, and have been manufactured by a variety of methods. In the past, the manufacturing method involved molding and sintering a metal powder by raw material packing and sintering, powder compressing and sintering, or another such method. In recent years it has become more common to employ a manufacturing method in which metal is deposited by electroless plating, electroplating, vapor phase plating, or another such plating method on the surface of a three-dimensionally reticulated sponge-like foam skeleton of urethane or the like, or a manufacturing method in which a foam is immersed in a slurry in which a metal powder has been dispersed. Furthermore, a method for forming a felt-like nonwoven cloth in which metal fibers are irregularly intermingled (see Japanese Laid-Open Patent Application 56-88266), a method for sintering and calendering a wire aggregate of stainless steel (see Japanese Laid-Open Patent Application 4-165006), and the like have been investigated.

Meanwhile, the electrode sheet of a cell is generally constructed such that one of these porous metal materials is used as a core, and this porous metal material is packed with a positive or negative active material. As mentioned above, there is a wide range of porous metal materials that can be used as the core of an electrode sheet in a cell in which a chemical reaction occurs, but of these, porous metal foams having a three-dimensionally reticulated structure have generally been employed in recent years. These porous metal foams are produced by electroplating a sponge-like foam, and those used primarily as cores of electrode sheets in nickel-cadmium cells, nickel-hydrogen storage cells, and other such secondary cells are porous metal foams comprising, for example, a sponge-like metal (such as nickel) 1 in which numerous pores 2 have been formed, as shown in FIG. 18. The metal skeleton of these porous metal foams has a sponge-like three-dimensionally reticulated structure, so the porosity can be as high as 98%, which means that compared to conventional porous metal materials, the specific surface area is higher and the air permeation resistance is lower. Furthermore, the pressure loss is minute, and the product can be in any shape desired.

These porous metal foams are manufactured by the method given in Japanese Patent Publication 57-39317. Specifically, conductivity is imparted to a sponge-like foam such as a polyurethane sheet with a three-dimensionally reticulated structure by impregnation with carbon or another conductive paint, electroless plating, or another such means, after which a metal is deposited by plating onto the surface of the foam skeleton, and this product is heated to burn away only the sponge-like foam, which yields a porous metal foam.

However, with a cell in which the above-mentioned porous metal foam is used as a core for an electrode sheet, if the pores 2 in FIG. 18 are made larger in an effort to increase the amount of slurry-like active material with a relatively high viscosity packed per unit of volume, because the active material in the center of the pores 2, which is not in direct contact with the reticulated metal 1, does not play a major role in charging and discharging, this can lead to a decrease in the utilization rate of the active material, so there is no improvement in the discharge characteristics per unit of cell volume. Conversely, if the shape is such that the pores 2 are smaller and the porosity is higher, the amount in which the active material is packed will be smaller, electrical resistance will increase, and not enough current will flow. Consequently, good performance is not obtained when a cell in which this porous metal foam is used as an electrode sheet core is used in applications that demand a large flow of current, such as electric cars, electric tools, electric lawnmowers, and so on.

Furthermore, since the manufacture of a porous metal foam involves the use of plating, costs are incurred in related equipment and waste liquid disposal, and higher electrical consumption also drives up the cost. Also, because it is difficult to control the plating conditions, the plating rate cannot be increased, so no improvement in productivity can be achieved. All of this means that a porous metal foam is expensive, and this also makes a porous metal foam unsuitable as an electrode sheet core for electric car cells, which make use of numerous electrode sheets.

An object of the present invention is to solve the above problems encountered in the past, and provide a porous metal material that can be manufactured simply and at a low cost, and that allows the availability of active material to be increased, and to provide a method for manufacturing this porous metal material.

DISCLOSURE OF THE INVENTION

The porous metal material of the present invention is characterized in that numerous metal staple fibers are integrally joined to a metal substrate sheet in a state in which they are erected more or less perpendicular to the surface of the metal substrate sheet.

The method of the present invention for manufacturing a porous metal material is characterized by comprising a step of utilizing a magnetic field to orient numerous metal staple fibers, and holding these metal staple fibers on the metal substrate sheet in a state of being more or less perpendicular thereto by means of an adhesive supplied to the metal substrate sheet, and a step of removing the adhesive by pyrolysis, and integrally joining the metal staple fibers and metal substrate sheet by sintering.

These inventions allow a porous metal material to be manufactured simply and at a low cost, and when this porous metal material is used as an electrode sheet core in a cell, the availability of active material can be increased.

BRIEF DESCRIPTION OF THE DRAWINGS

FIG. 1 is an early-stage flow chart illustrating the method for manufacturing a porous metal material in the first embodiment of the present invention;

FIG. 2 is a later-stage flow chart thereof;

FIG. 17 is a flow chart illustrating the method for manufacturing a porous metal material in the sixth embodiment of the present invention.

BEST MODE FOR CARRYING OUT THE INVENTION

Figure 3:
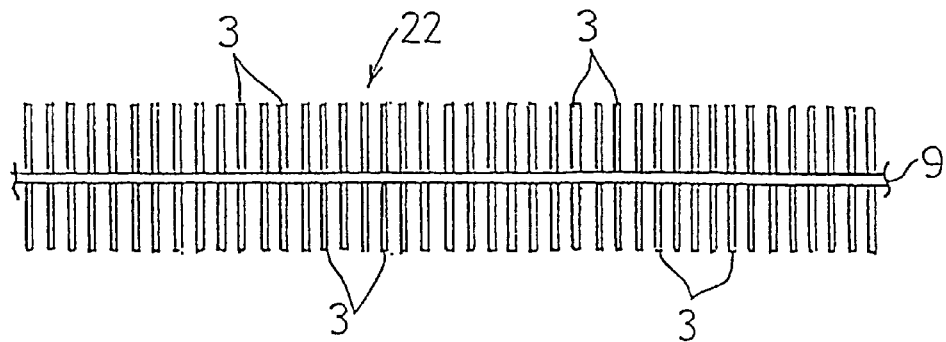
FIG. 3 is a front view of the porous metal material obtained by the above-mentioned manufacturing method.

Preferred embodiments of the present invention will now be described in detail through reference to the figures. FIG. 1 is an early-stage flow chart illustrating the method for manufacturing a porous metal material in the first embodiment of the present invention. In this early-stage flow chart, (a) is a demagnetization step, (b) is a scattering step, (c) is a dispersal correction step, (d) is an alignment step, and (e) is an adhesive application step. After going through these steps, numerous metal staple fibers 3 stand close together in a vertical attitude on a metal substrate sheet 9. With the manufacturing method in this embodiment, it is a requirement that, of the metal substrate sheet 9 and the metal staple fibers 3, at least the metal staple fibers 3 be a magnetic substance, and it is even better if the metal staple fibers 3 are a ferromagnetic substance.

First, let us discuss the metal substrate sheet 9 and the metal staple fibers 3 that are the main structural elements of the porous metal material of the present invention. The metal substrate sheet 9 can be a thin, belt-form metal sheet which has undergone a perforation treatment to form numerous pores, a thin, belt-form metal sheet which has not undergone a perforation treatment but is composed of a metal fiber nonwoven cloth or other such material that is air permeable, a thin, belt-form metal sheet or metal foil which has not been perforated, or the like. This sheet may be either magnetic or non-magnetic, but when it is used as an electrode sheet core in a cell, it must be conductive because it will also be made to act as a collector.

Meanwhile, the metal staple fibers 3 may be composed of a pure metal, or they may be produced by dispersing a metal powder in a resin. The raw material can be nickel, cobalt, iron, steel, an iron and nickel alloy, an iron, cobalt and nickel alloy, nickel-covered steel, ferrite, or another such ferromagnetic metal material. In short, it should be a metal that can be sintered. It is preferable for the metal staple fibers 3 to be in the form of needles, columns, or flat strips, but they can also be in the form of wedges or hollow cylinders. When manufacturing a porous metal material for use as an electrode sheet core in a cell, it is preferable to use nickel as the primary material for the metal substrate sheet 9 and the metal staple fibers 3.

The metal staple fibers 3 discussed above were obtained by an ordinary spinning method. However, metal staple fibers can also be obtained by kneading a metal powder with a binder resin and then molding this into a slender form. For instance, they can be obtained by mixing a butyral resin (PBV) into a nickel powder with an average particle diameter of 1.0 $\mu$m in a weight ratio of 100 to 25, mixing in isophorone as a solvent, thoroughly kneading this mixture in a known triple-roll machine, a kneader, or the like, applying this kneaded product in a slender fiber form over a film or paper that has undergone a release treatment by screen printing or gravure printing, and then peeling off this coating.

There are no particular restrictions on the diameter and length of the metal staple fibers 3, their density with respect to the metal substrate sheet 9, or the size and thickness of the metal substrate sheet 9, and these can be appropriately selected according to the required characteristics and the intended application. When the present invention is to be used as the core for a cell electrode sheet, the metal staple fibers 3 should have a diameter of several dozen to several hundred microns and a length of 0.5 to 5 mm, and these metal staple fibers 3 should be arranged on the metal substrate sheet 9 in a density such that the spacing between the fibers is from several dozen to several hundred microns. It is preferable for the spacing to be set to between 200 and 300 $\mu$m. In this embodiment, nickel staple fibers with a straight form, a diameter of about 50 $\mu$m, and an average length of 2.5 mm are used as the metal staple fibers 3, and a nickel-plated steel sheet with a thickness of 35 $\mu$m in which countless holes with a diameter of 0.5 mm have been formed is used as the metal substrate sheet 9. These specifications are for use as an electrode sheet core in a cell. The use of this porous metal material allows the active material to be packed smoothly all the way down to the bases of the metal staple fibers 3 sticking up like brush bristles.

First, the metal staple fibers 3 composed of nickel (a ferromagnetic material) are demagnetized such that they do not become magnets by a demagnetization apparatus 8 designed on the basis of the same principle as a known magnetic tape demagnetizer. Specifically, when a plastic conveyance case 4 containing numerous metal staple fibers 3 passes through the interior of the demagnetization apparatus 8 while being conveyed by a conveyor belt 7, the metal staple fibers 3 inside the conveyance case 4 are agitated and demagnetized by a powerful magnet (not shown) rotating inside the demagnetization apparatus 8. The reason for passing the metal staple fibers 3 through the demagnetization apparatus 8 while thus contained in the conveyance case 4 is that the metal staple fibers 3 will be attracted to the demagnetization apparatus 8 if they are passed through the demagnetization apparatus 8 just as they are. The conveyance case 4 exits the demagnetization apparatus 8 and stops at the point when it reaches the conveyance terminal of the conveyor belt 7, indicated by a two-dot chain line. The metal staple fibers 3 are forcibly discharged from a discharge opening 4a and poured into a hopper 10.

Beneath the hopper 10, the metal substrate sheet 9 is moved continuously, horizontally, and at a constant rate by a movement mechanism (not shown) and a pair of guide rollers 11. A constant amount of the metal staple fibers 3 are scattered over this metal substrate sheet 9 from the hopper 10. Because the metal staple fibers 3 have already been demagnetized by the demagnetization apparatus 8, they are scattered in a uniform distribution over the surface of the metal substrate sheet 9.

An ultrasonic vibrator 12 is positioned beneath the metal substrate sheet 9 at the location where the metal substrate sheet 9 has moved slightly respect to the hopper 10, such that the ultrasonic vibrator 12 is in contact with the lower surface of the metal substrate sheet 9 during the movement thereof. The moving metal staple fibers 3 scattered over the metal substrate sheet 9 are subjected to ultrasonic vibration by the ultrasonic vibrator 12, and are adjusted to a more uniform distribution.

Next, in the alignment step, the movement of the metal substrate sheet 9 causes the numerous metal staple fibers 3 that have been adjusted to a uniform distribution as above to move between orienting magnet components 13 disposed above and below the movement path of the metal substrate sheet 9. These orienting magnet components 13 are disposed along the movement path of the metal substrate sheet 9, facing each other such that a plurality of magnets 13a form pairs, for example, and generate a uniform orienting magnetic field over a specific range of distance along the movement path of the metal substrate sheet 9. Therefore, the metal staple fibers 3 on the metal substrate sheet 9 are subjected to a magnetic field perpendicular to the metal substrate sheet 9, and are oriented vertically on the metal substrate sheet 9. Specifically, the metal staple fibers 3 are stood up in close file on the metal substrate sheet 9. The number of magnets 13a provided to the orienting magnet components 13 should be appropriately set according to the movement speed of the metal substrate sheet 9 and other such factors. The magnets 13a may be either electromagnets or permanent magnets.

A pipe 17 connected to an adhesive container 14 is inserted between the above-mentioned orienting magnet components 13, and a spray nozzle 18 at the distal end of the pipe 17 is aimed toward the upper surface of the metal substrate sheet 9. An adhesive 19 contained in the adhesive container 14 is sprayed from this spray nozzle 18 toward a spot where the metal staple fibers 3 have already been vertically oriented on the metal substrate sheet 9, and the metal staple fibers 3 vertically oriented on the metal substrate sheet 9 are tacked in place in this oriented state by the tack layer of the adhesive 19 formed on the metal substrate sheet 9. A solution of a polyvinyl acetate resin, an acrylic resin, a butyral resin, a phenol resin, or another such resin is used as the adhesive 19. A resin solution in which a metal powder has been dispersed can also be used as the adhesive in order to enhance conductivity and joining between the metal staple fibers 3 and the metal substrate sheet 9. Although not shown in the figures, if drying air is blown onto the metal substrate sheet 9 and the metal staple fibers 3 immediately after the adhesive 19 is sprayed, the sprayed adhesive 19 will harden and securely support the metal staple fibers 3 in their vertical state with respect to the metal substrate sheet 9.

FIG. 2 is a later-stage flow chart of the method for manufacturing a porous metal material in the above embodiment. In this later-stage flow chart, the numerous metal staple fibers 3 go through (f) a heat step and (g) a reduction step, which integrally joins them to the metal substrate sheet 9 and yields a porous metal material. In the heating step, the air atmosphere inside a heating furnace 20 is heated to between 400 and 600° C. to effect oxidation, pyrolyze the adhesive 19, and begin the sintering of part of the nickel (metal). Finally, in the reduction step, this product is heated at 800 to 1200° C. in a reduction furnace 21 containing a reductive gas, such as a mixed gas of hydrogen and nitrogen (such as 5% hydrogen and 95% nitrogen). This completely removes the adhesive 19, and the metal staple fibers 3 and the metal substrate sheet 9 are integrally linked by sintering, which results in the brush-like porous metal material 22 shown in FIG. 3, which has a high porosity, such as 90% or higher. The porous metal material 22 is fixed to one side of the metal substrate sheet 9 in FIG. 2, but numerous metal staple fibers 3 can also be fixed to the other side of the metal substrate sheet 9 by the same process, which is shown in FIG. 3.

With the above manufacturing method, the metal substrate sheet 9 is continuously moved at a constant rate, and the metal substrate sheet 9 and the metal staple fibers 3 can be integrated by sintering after the metal staple fibers 3 have been supported on this moving metal substrate sheet 9 by the adhesive 19 while vertically oriented, so mass production is possible at a much higher rate of productivity than when single units are manufactured as with a conventional porous metal foam. Furthermore, no plating or other such method is employed, the metal staple fibers 3 are scattered on the metal substrate sheet 9 and then oriented vertically with respect to the metal substrate sheet 9 by the orienting magnet components 13, and the metal staple fibers 3 are tacked in place in their oriented state by the adhesive 19 prior to sintering, all of which means that the product can be manufactured easily, with equipment that is simple and inexpensive.

When a cell electrode sheet is constructed using the above porous metal material 22 as a core, the active material will be smoothly packed between the brush-like metal staple fibers 3, the packing amount will be uniform, and furthermore almost all of the active material will be in contact with the metal staple fibers 3, so the active material utilization rate will be extremely high, allowing the production of an electrode sheet for a cell from which a large current can be extracted. It was further confirmed that if a resin solution in which a metal powder has been dispersed is used as the above-mentioned adhesive 19, the metal staple fibers 3 will be fixed more securely to the metal substrate sheet 9 by the metal paint layer formed on the surface of the metal substrate sheet 9, and a higher-quality porous metal material 22 will be obtained.

Figure 4:
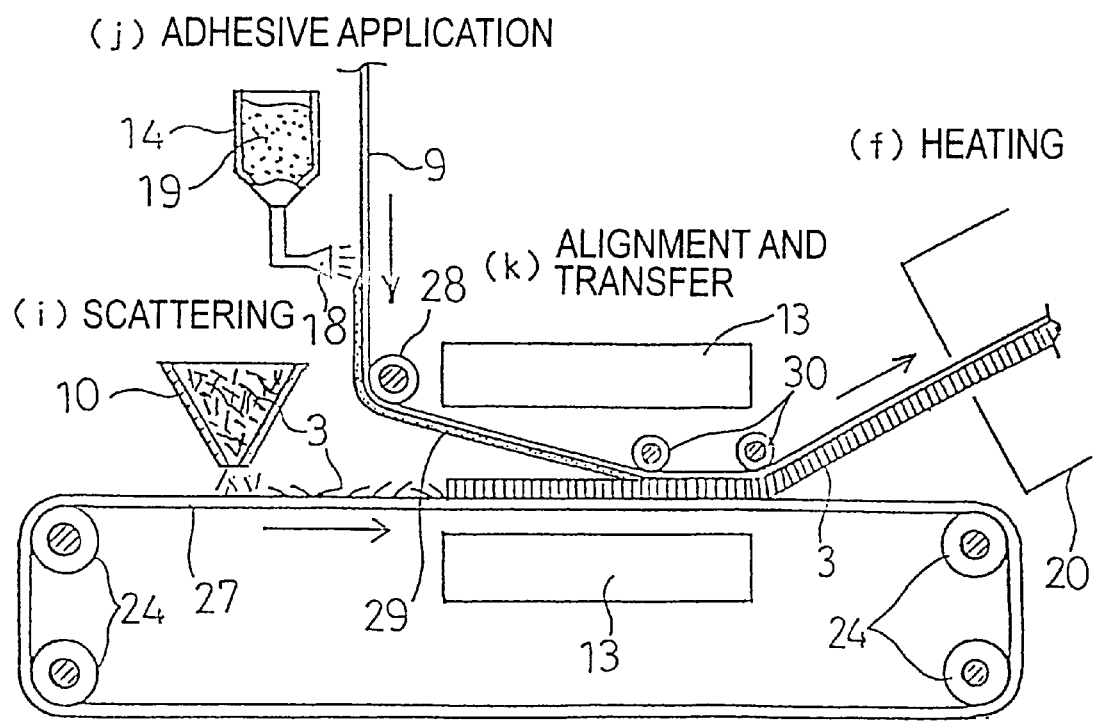
FIG. 4 is a flow chart illustrating the method for manufacturing a porous metal material in the second embodiment of the present invention.

FIG. 4 is a flow chart illustrating the gist of the method for manufacturing a porous metal material in the second embodiment of the present invention. In the scattering step (i), the metal staple fibers 3 are not directly scattered over the metal substrate sheet 9 as in the first embodiment above, but rather are continuously scattered in a uniform distribution from the hopper 10 onto a conveyor 27 composed of a non-magnetic material and rotated by a plurality of guide rollers 24. Meanwhile, in the adhesive coating step (j), the adhesive 19 is sprayed from the spray nozzle 18 at the metal substrate sheet 9, which is continuously moving at a constant rate via a guide roller 28, thus forming a tack layer 29 on the opposing side of the metal substrate sheet 9.

In the alignment and transfer step (k), the metal staple fibers 3 scattered on the conveyor 27 are moved by the conveyor 27 between the orienting magnet components 13, which are disposed above and below the conveyance path of the conveyor 27 and are the same as in the first embodiment. Here, the metal staple fibers 3 are subjected to a magnetic field perpendicular to conveyance direction of the conveyor 27, and are oriented vertically on the conveyor 27. Meanwhile, the direction in which the metal substrate sheet 9 is moving is changed by two pressing guide rollers 30 so that the metal substrate sheet 9 is parallel to the running direction of the conveyor 27, and the metal substrate sheet 9 is guided so that the tack layer 29 is pressed against the metal staple fibers 3 vertically erected on the conveyor 27. Therefore, the metal staple fibers 3 on the conveyor 27 adhere to the tack layer 29 while still vertical to the metal substrate sheet 9, and are thereby transferred from the conveyor 27 onto the metal substrate sheet 9. After this, the heating step (f) and reduction step (g) are performed in the same manner as in the first embodiment, which yields the porous metal material 22 shown in FIG. 3.

In this embodiment, a homogeneous tack layer 29 can be reliably formed on the surface of the metal substrate sheet 9, and since the metal staple fibers 3 are scattered over the conveyor 27, an even more uniform distribution can be achieved than when the fibers are scattered directly over the metal substrate sheet 9. Furthermore, since the metal staple fibers 3 are transferred to the metal substrate sheet 9 by being pressed against the tack layer 29 that has already been formed, the resulting porous metal material 22 can be of a higher quality and have a higher density.

Figure 5:
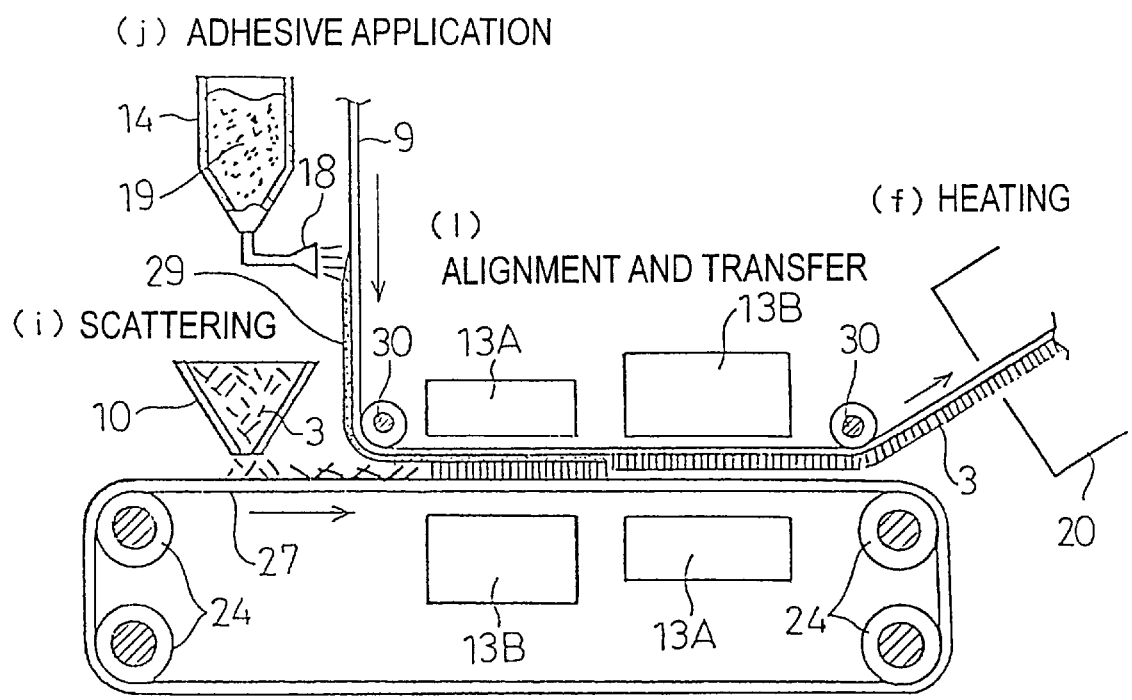
FIG. 5 is a flow chart illustrating the method for manufacturing a porous metal material in the third embodiment of the present invention.

FIG. 5 is a flow chart illustrating the gist of the method for manufacturing a porous metal material in the third embodiment of the present invention. The only difference from the second embodiment is in the alignment and transfer step (l), and the rest of the steps are the same. Specifically, in the first half of the alignment and transfer step (l), an orienting magnet component 13A of low magnetic intensity is disposed at the side of the conveyor 27 where the metal staple fibers 3 are scattered, and an orienting magnet component 13B of high magnetic intensity is disposed at the opposite side from the above-mentioned scattering side and facing 13A, while in the second half of the step the orienting magnet component 13B of high magnetic intensity is disposed at the side of the conveyor 27 where the metal staple fibers 3 are scattered, and the orienting magnet component 13A of low magnetic intensity is disposed at the opposite side from the above-mentioned scattering side and facing 13B.

Therefore, in the first half of the step, the metal staple fibers 3 are oriented vertically with respect to the conveyor 27 ahead of time, and then, in the second half of the step, the metal staple fibers 3 are transferred to the metal substrate sheet 9 such that they are plunged into the tack layer 29 by the attraction produced by the orienting magnet component 13B with a powerful magnetic field. As a result, the porous metal material obtained in this embodiment is more effective in applications that require a particularly large current, the reason for which being that the metal staple fibers 3 are standing in a vertical state in which the distal ends thereof are reliably in contact with the surface of the metal substrate sheet 9, so a cell in which the electrode sheet is constructed using this porous metal material as a core has lower electrical resistance.

Figure 7:
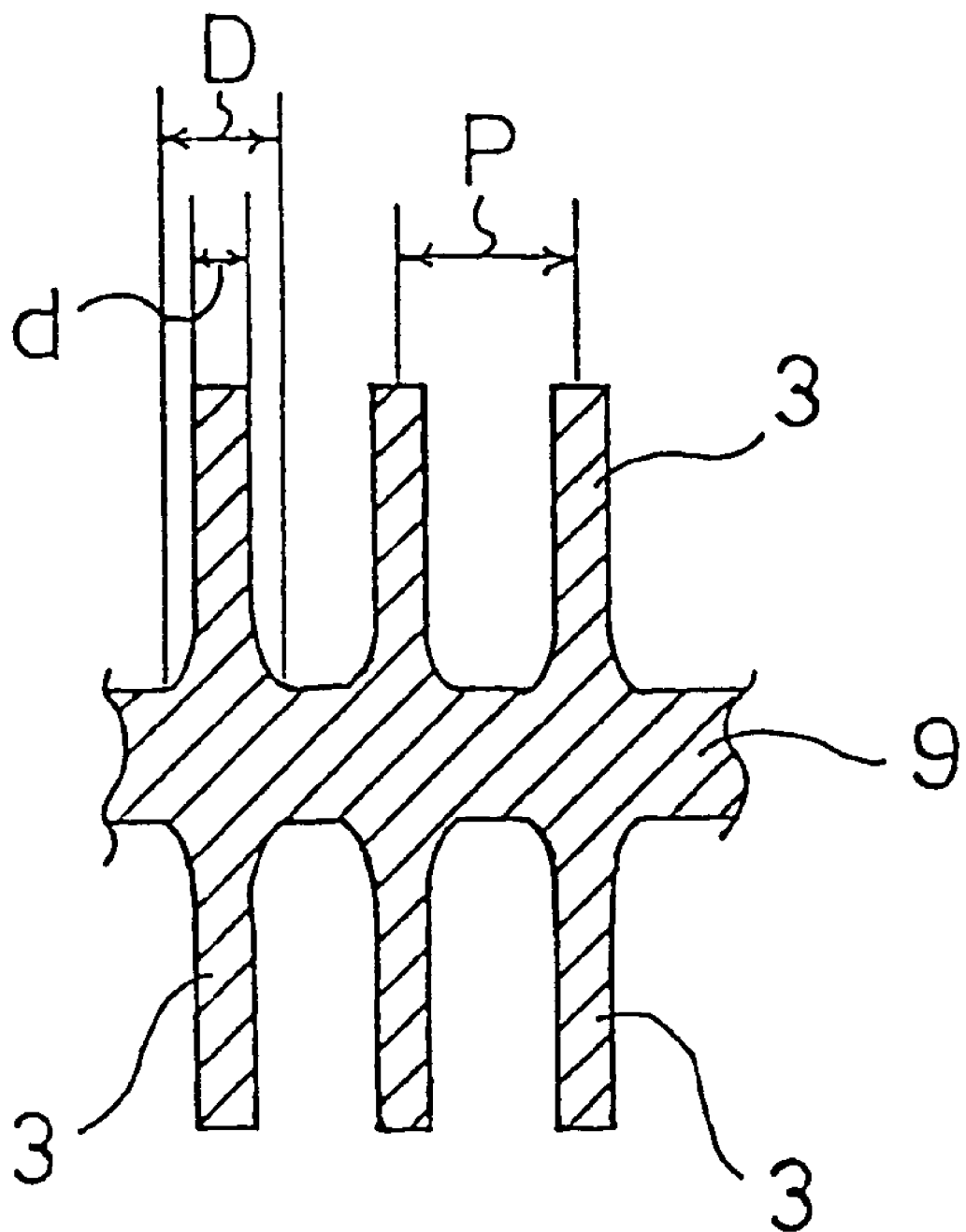
FIG. 7 is an enlarged cross section of the state of sintering of the metal staple fibers and the metal substrate sheet.

In the above embodiments, the metal staple fibers 3 and the metal substrate sheet 9 were integrally joined by sintering, so, as shown in FIG. 7, even when metal staple fibers 3 having the same diameter in the axial direction are used, the diameter D of the base of the metal staple fibers 3 is larger than the diameter d of the distal end, and this enhances the joining of the metal staple fibers 3 with the metal substrate sheet 9.

In the above embodiments, the numerous metal staple fibers 3 scattered on the metal substrate sheet 9 or on the conveyor 27 are vertically oriented, after which they are held erect on the metal substrate sheet 9 by the adhesive 19, so, as shown in FIG. 7, a porous metal material can be easily obtained in which these metal staple fibers 3 are integrally joined to the surface of the metal substrate sheet 9 at a roughly equal pitch P both laterally and longitudinally. A porous metal material was obtained by performing the scattering of the metal staple fibers 3 onto the metal substrate sheet 9 simultaneously with the scattering of the adhesive 19 in a magnetic field.

In the above third embodiment, the orienting magnet component 13A with a low magnetic intensity is combined with the orienting magnet component 13B with a high magnetic intensity in order to transfer the metal staple fibers 3 from the conveyor 27 to the metal substrate sheet 9, but it is also possible for the metal staple fibers 3 to be transferred from the conveyor 27 to the metal substrate sheet 9 by providing a pair of orienting magnet components having equivalent magnetic field intensities, one above and one below, just as is shown in FIG. 4.

Figure 6:
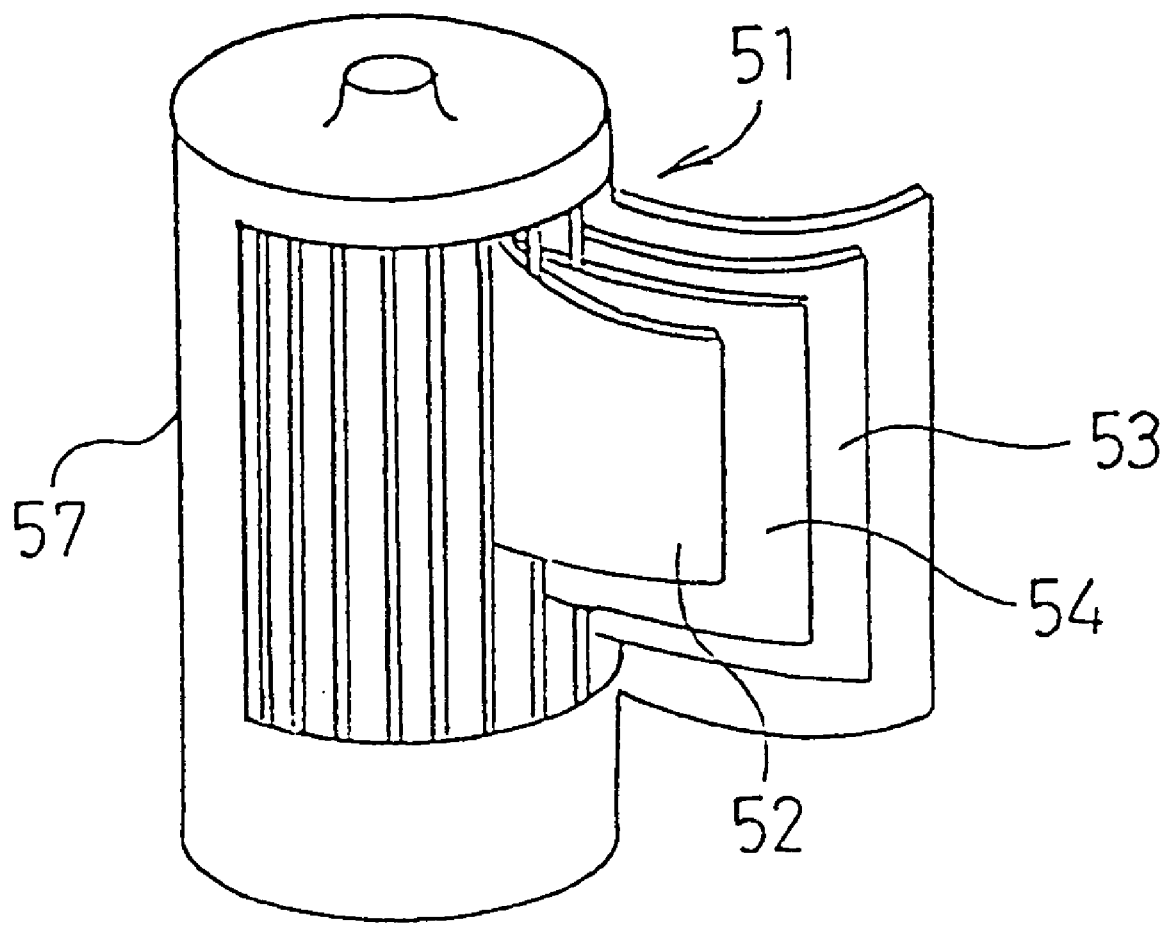
FIG. 6 is an exploded oblique view of a cell in which the porous metal material of the present invention is used as an electrode sheet core.
Figure 18:
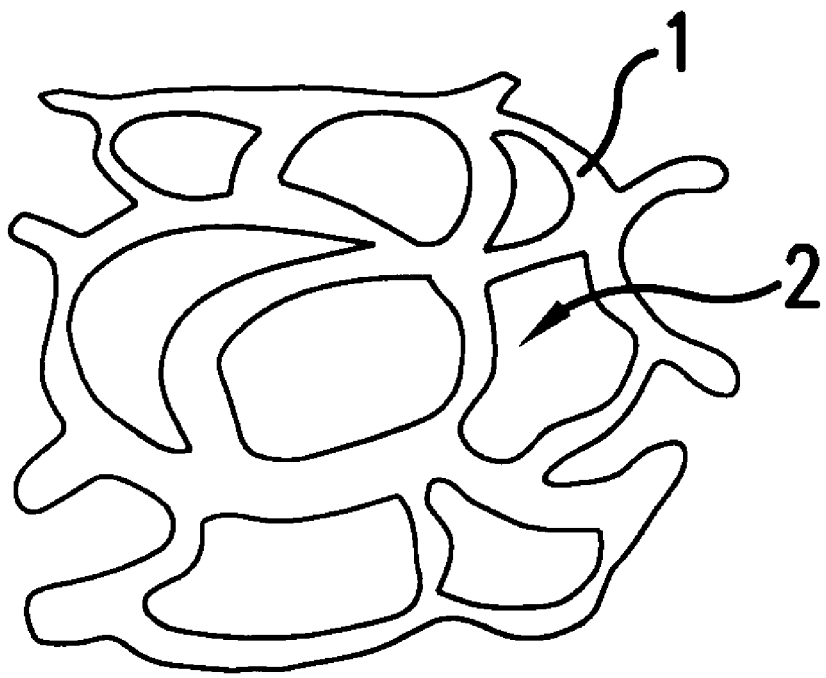
FIG. 18 is a partial cross section that schematically illustrates a conventional porous metal foam.

Next will be described a cell electrode sheet constructed using the porous metal material 22 obtained by the manufacturing methods pertaining to the above embodiments, and particularly an electrode sheet for a nickel-hydrogen storage cell produced from a porous metal material in which nickel was used for the metal staple fibers 3. The porous metal material 22 shown in FIG. 3 is used as the core of the electrode sheet, that is, as the electrode active material support. 83 weight parts nickel hydride, 10 weight parts nickel powder, and 7 weight parts cobalt powder were made into a paste with an aqueous solution of carboxymethyl cellulose, and the resulting active material was packed by being worked into the above-mentioned porous metal material 22 and then dried, after which this product was calendered to yield a nickel electrode sheet with a thickness of 1 mm. As shown in FIG. 6, this nickel electrode sheet was used as a positive electrode sheet 52 and wound in a spiral with a known separator 54 interposed between it and a negative electrode sheet 53 composed of a hydrogen occluding alloy. This assembly was housed in a cell case 57 to produce a sealed nickel-hydrogen storage cell 51. Also, for the sake of comparison, another cell was produced using the conventional porous metal foam shown in FIG. 18, which was obtained by plating.

These cells were charged under specific charging conditions, a constant current discharge test was conducted, and the discharge time was noted, the results of which are given in Table 1. In Table 1, the discharge time of the cell incorporating the conventional porous metal foam is set at 100%, and the discharge time of the cell incorporating the porous metal material 22 of the present invention is given as a relative value.

TABLE 1

| | 400 mA discharge | 1200 mA discharge |
|---|---|---|
| Cell using porous metal material 22 | 100% | 270% |
| Cell using conventional porous metal foam | 100% | 100% |

As is clear from Table 1, it was found that a particularly pronounced discharge effect was obtained in applications involving a large current with the cell produced using the porous metal material obtained by the manufacturing method of the present invention.

Figure 8:
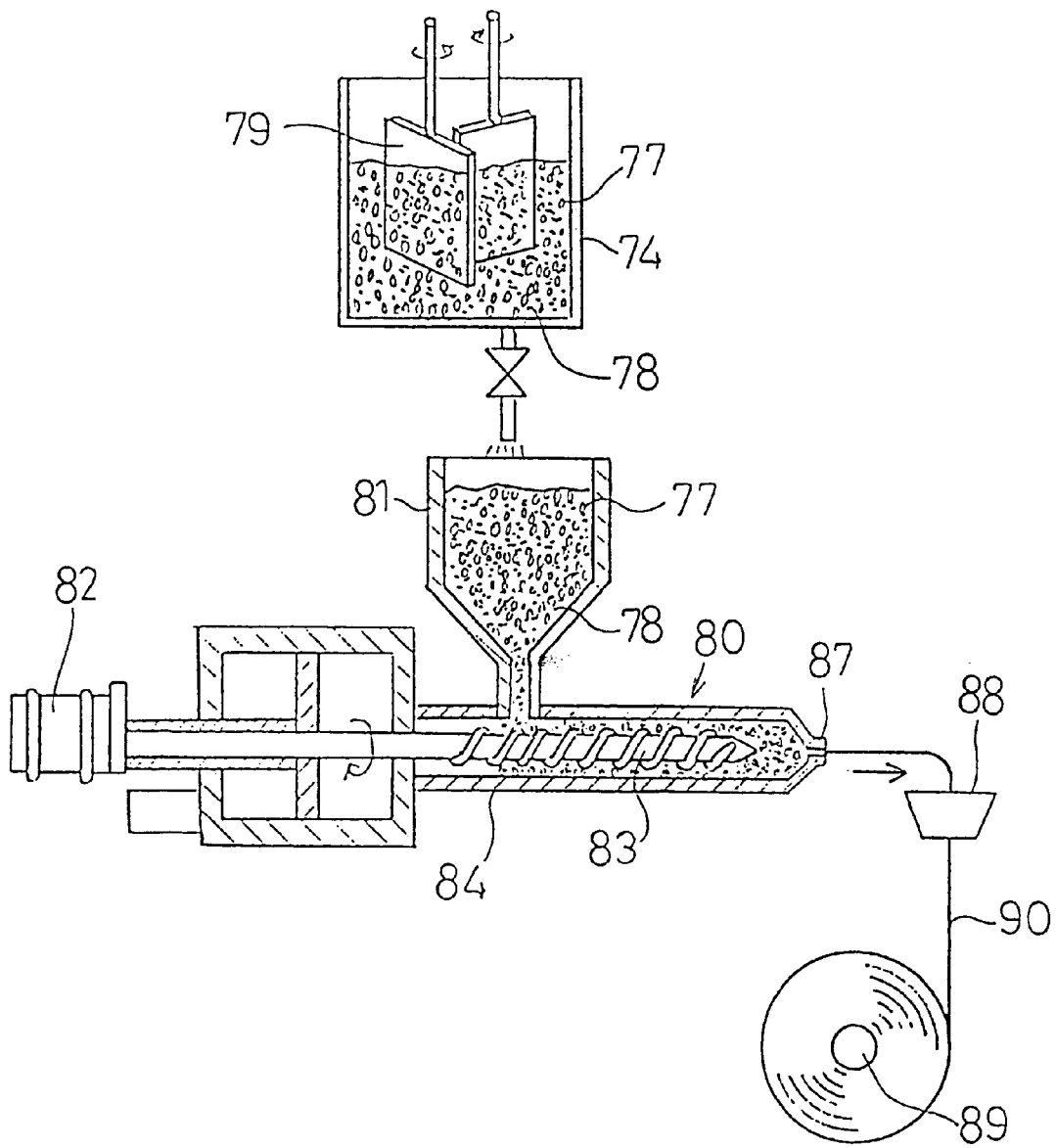
FIG. 8 is an early-stage flow chart illustrating the method for manufacturing a porous metal material in the fourth embodiment of the present invention.

The fourth embodiment of the present invention will now be described through reference to the figures. FIG. 8 is an early-stage flow chart of the production of the metal staple fibers in the method for manufacturing a porous metal material pertaining to the fourth embodiment of the present invention. In this figure, a metal powder 77, such as nickel powder with an average particle diameter of 3.0 μm, and a polymer 78 (binder resin), such as a polyvinyl butyral resin, are mixed and held in a kneading tank 74, a solvent is admixed as needed, and this mixture is thoroughly agitated by agitation blades 79. In addition to what is shown in the figure, a known triple-roll machine, a kneader, or the like can be used for this kneading.

When a porous metal material that will be used as an electrode sheet core in a cell is being manufactured, it is preferable to use nickel powder as the metal powder 77, but it is not a particular requirement that nickel powder be used, and any metal that can be sintered as required by the intended application can be used. Also, the metal powder 77 is not particularly limited to a pure metal powder, and there will be no problem if a metal oxide or metal hydroxide powder, or a mixed powder of one of these metal powders and a pure metal powder is used, since the powder will undergo reduction in the later stage of the manufacturing process.

The above-mentioned mixture of the metal powder 77 and the polymer 78 is put into the hopper 81 of an extrusion molding machine 80, and it is moved through a housing 84 and toward a nozzle 87 while it is further kneaded by a screw 83 that is rotated by a motor 82 in the direction of the arrow. The mixture melts as it is moved along by the screw 83, is extruded in the form of a yarn from the nozzle 87, and then goes through a spinneret 88 and is converted into a metal-resin composite fiber 90 of the required form, after which it is wound under tension onto a winding roll 89.

The above-mentioned spinneret 88 molds the mixture into a metal-resin composite fiber 90 that has a circular cross section and the required fiber diameter, and when the porous metal material is produced for use as a cell electrode sheet core, the fiber diameter can be set to a range of 10 to 300 μm, and preferably 30 to 200 μm. If this diameter is less than 30 μm, strength will be low after attachment to the metal substrate sheet and sintering (discussed below), so the metal staple fibers 3 cannot be held in as vertical a state with respect to the metal substrate sheet, and the porous metal material will tend not to have enough space for the active material to be packed. On the other hand, a diameter over 200 μm is too large, so sufficient space for packing the active material cannot be ensured. The content of the metal powder 77 in the kneaded mixture is set to between 30 and 85 wt %. This is because the strength will be inadequate after attachment to the metal substrate sheet and sintering if the setting is below 30 wt %, whereas if the setting is over 85 wt %, then when the kneaded mixture is spun from the above-mentioned extrusion molding machine 80, it will not be able to withstand the winding tension produced by the winding roll 89, breakage will occur, and the yield will decrease, or the rotational speed of the screw 83 will have to be lowered, so an increase in productivity cannot be achieved.

Figure 9:
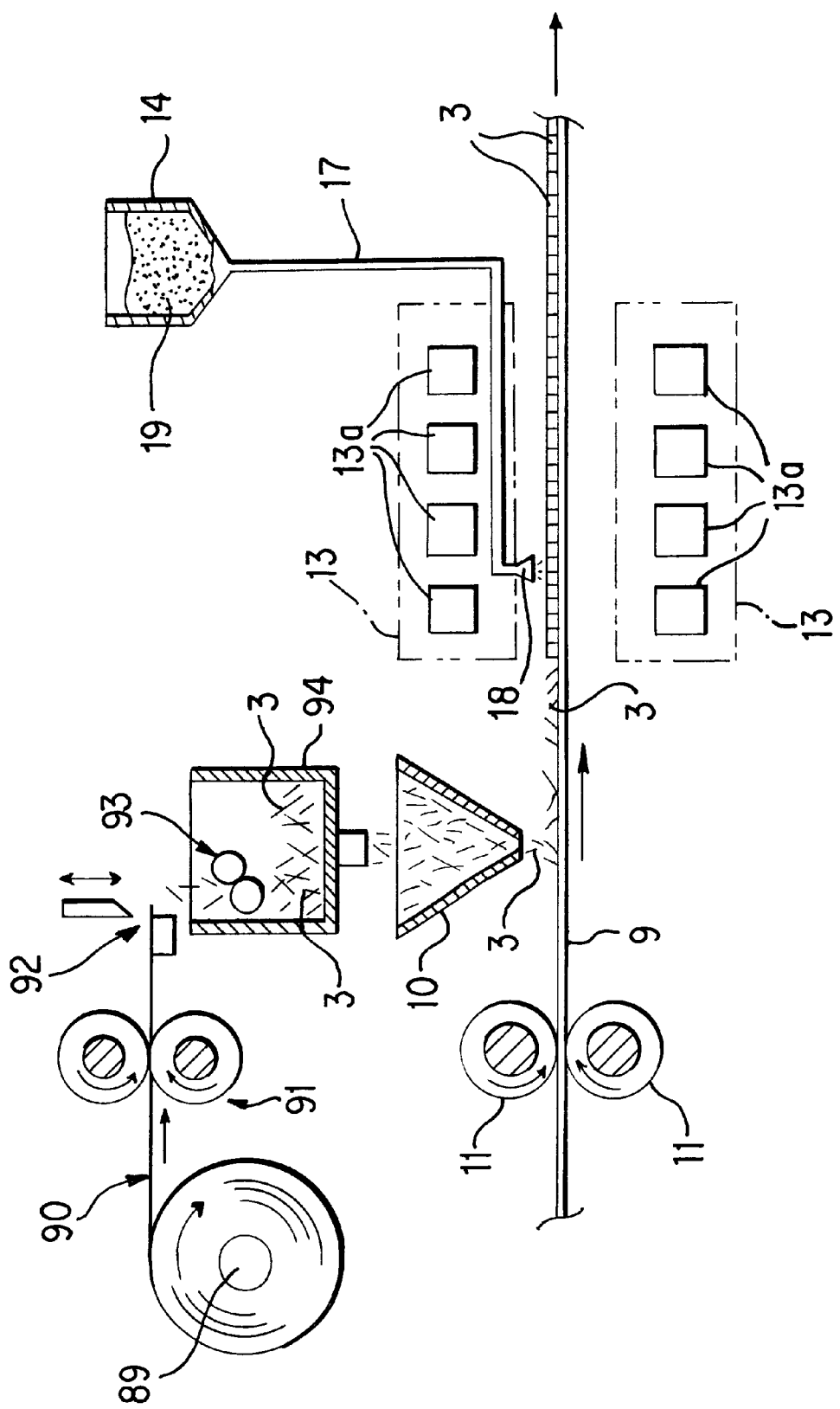
FIG. 9 is a later-stage flow chart thereof.

FIG. 9 is a flow chart of part of the process pertaining to the manufacture of a porous metal material, and includes the later-stage steps for producing the metal staple fibers. In this figure, the metal-resin composite fiber 90 wound onto the above-mentioned winding roll 80 is intermittently moved by being pulled out a certain amount by a constant feed apparatus 91, and is cut to a specific length by a cutter apparatus 92 to form metal staple fibers 3 composed of a metal powder and a binder resin. Next, the metal staple fibers 3 are unraveled by an unraveler 93, after which they are temporarily put into a storage box 94. The length of the metal staple fibers 3 is set at about 0.5 to 5 mm, which allows a porous metal material to be obtained that is favorable as a core for use in a cell electrode sheet. The steps in FIG. 8 are continuous with the step in FIG. 9 in which the metal-resin composite fiber 90 is cut.

The rest of the porous metal material manufacturing process is the same as in the first embodiment, and the porous metal material 22 shown in FIG. 3 is obtained by going through the steps shown in FIGS. 1 and 2. In this embodiment, the binder resin (polymer) 78 is pyrolyzed and removed along with the adhesive 19 in the heating step and reduction step shown in FIG. 2.

Figure 10:
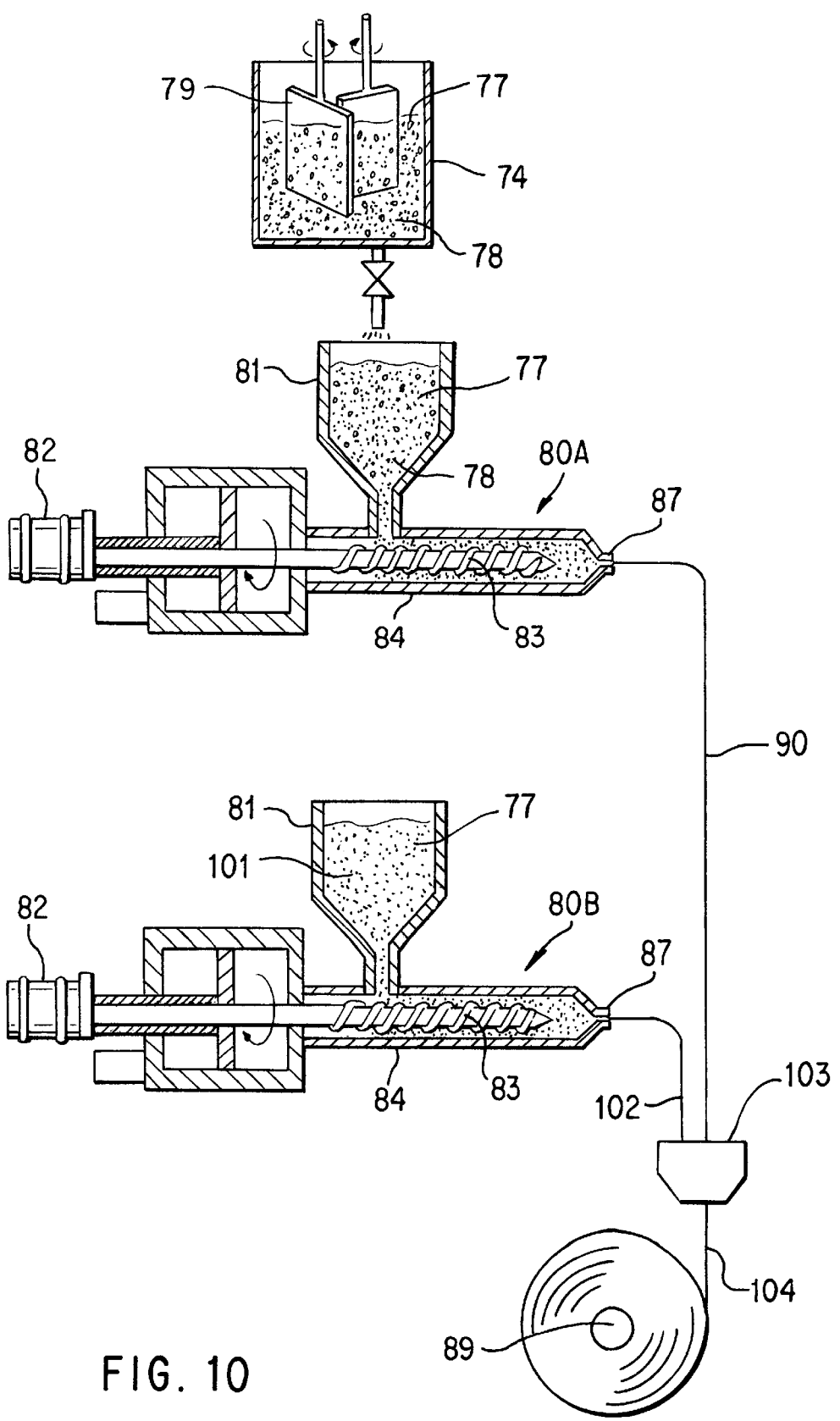
FIG. 10 is an early-stage flow chart illustrating the method for manufacturing a porous metal material in the fifth embodiment of the present invention.
Figure 11:
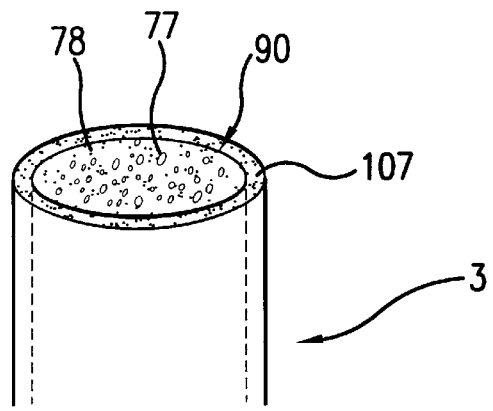
FIG. 11 is an oblique view, in cross section form, of the metal staple fiber obtained in the step in FIG. 10.

FIG. 10 is a flow chart illustrating the early stage in the production of the metal staple fibers in the method for manufacturing a porous metal material pertaining to the fifth embodiment of the present invention. The manufacturing equipment for the metal-resin composite fiber 90, comprising a first extrusion molding machine 80A that is the same as that shown in FIG. 8, is set up alongside a second extrusion molding machine 80B. The hopper 81 of the second extrusion molding machine 80B contains pellets 101 of polyethylene terephthalate or another such polymer. The nozzle 87 of this second extrusion molding machine 80B has a larger diameter than that of the nozzle 87 of the first extrusion molding machine 80A. The resin strand 102 extruded from the second extrusion molding machine 80B is sent to a dual spinneret 103 along with the metal-resin composite fiber 90 from the first extrusion molding machine 80A. This dual spinneret 103 covers the outside of the metal-resin composite fiber 90 with polyethylene terephthalate or another resin 102 as it is discharged. The double-layer composite fiber 104 discharged from this dual spinneret 103 is wound on the winding roller 89. The double-layer composite fiber 104 wound by this winding roller 89 is cut to a specific size in a cutting step that is the same as that shown in FIG. 9, which yields metal staple fibers 3 in which the outside of the metal-resin composite fiber 90 is covered with a resin sheath layer 107, as shown by the oblique schematic view in FIG. 11.

The metal-resin composite fiber 90 in this embodiment is produced by admixing the metal powder 77 such that it is contained in an amount of 60 to 95 wt %. Specifically, even if the content of the metal powder 77 is increased as above, since the double-layer composite fiber 104 is reinforced by the resin sheath layer 107 against deterioration of the dynamic properties of the fiber itself, there will be no breakage when the metal-resin composite fiber 90 is taken out of the first extrusion molding machine 80A at a high speed and wound under tension by the winding roller 89 at a high speed.

Figure 12:
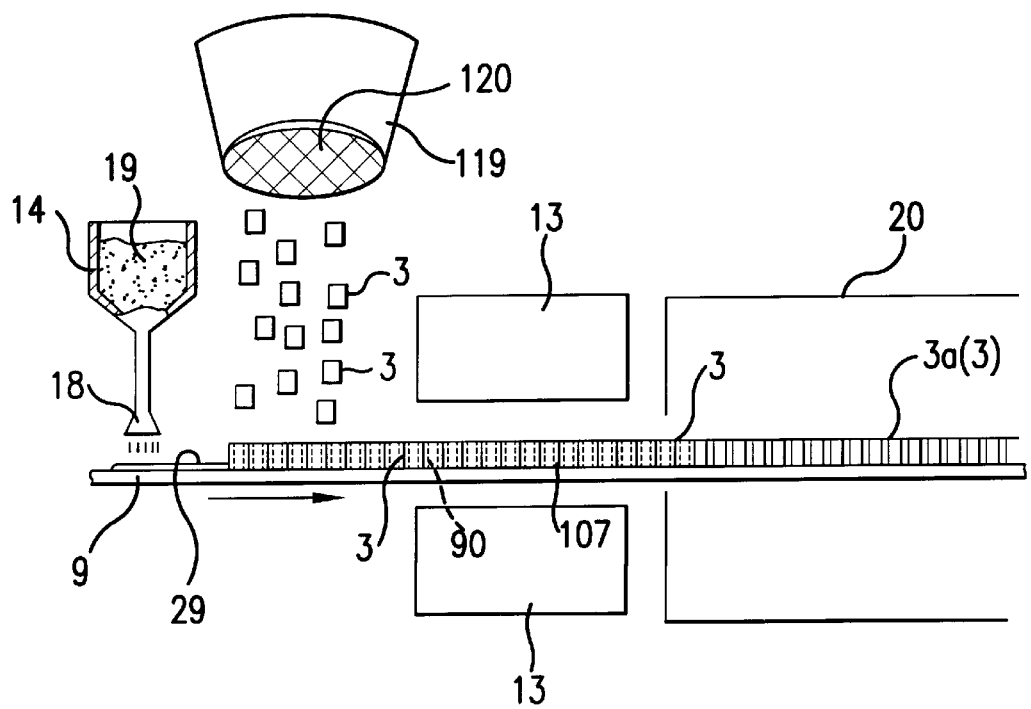
FIG. 12 is a later-stage flow chart of FIG. 10.

Next, the process for manufacturing the porous metal material 22 using the above-mentioned metal staple fibers 3 will be described. As shown in FIG. 12, the adhesive 19 held in the adhesive container 14 is sprayed from the spray nozzle 18 onto the continuously moving metal substrate sheet 9, thus forming the tack layer 29 in advance. Meanwhile, the metal staple fibers 3 are implanted by electrostatic flocking in the metal substrate sheet 9. Specifically, the metal staple fibers 3 are contained in a holding bin 119, the bottom of which is made from a metal mesh 120, and a high voltage is applied (not shown in the figures) between the metal mesh 120 and the metal substrate sheet 9 from a power supply using the metal substrate sheet 9 side as the ground pole. As a result, because the metal staple fibers 3 inside the holding bin 119 are positively charged through the metal mesh 120, when they fall through the openings in the metal mesh 120, they are attracted to the metal substrate sheet 9 that serves as the ground pole, gliding down while still supported vertically with respect to the metal substrate sheet 9, then they are plunged into and implanted in the tack layer 29 on the surface of the metal substrate sheet 9, and are supported in this implanted state by the tack layer 29. The metal staple fibers 3 may be scattered over the metal substrate sheet 9 as shown in FIG. 9.

Next, the metal staple fibers 3 implanted on the metal substrate sheet 9 as above enter the orienting magnet components 13 as the metal substrate sheet 9 moves along. The metal staple fibers 3 which were not implanted vertically with respect to the metal substrate sheet 9 in the flocking process are subjected to a magnetic field perpendicular to the metal substrate sheet 9, and are vertically oriented on the metal substrate sheet 9. As a result, all of the metal staple fibers 3 are in a state of standing close together and vertically on the metal substrate sheet 9.

The flow then goes through the heating furnace 20 shown in FIG. 12 and the reduction furnace 21 (not shown), which pyrolyzes and removes the polymer 78 in the metal-resin composite fiber 90 and the resin of the resin sheath layer 107, whereupon the remaining staple fiber-form metal (metal staple fibers) 3a is properly aligned at a roughly equal spacing corresponding to the thickness of the resin sheath layer 107, and intermingled. This allows a porous metal material of extremely high quality to be obtained.

The method for manufacturing metal staple fibers pertaining to the sixth embodiment of the present invention, and the method for manufacturing a porous metal material based thereon, will now be described.

Figure 13:
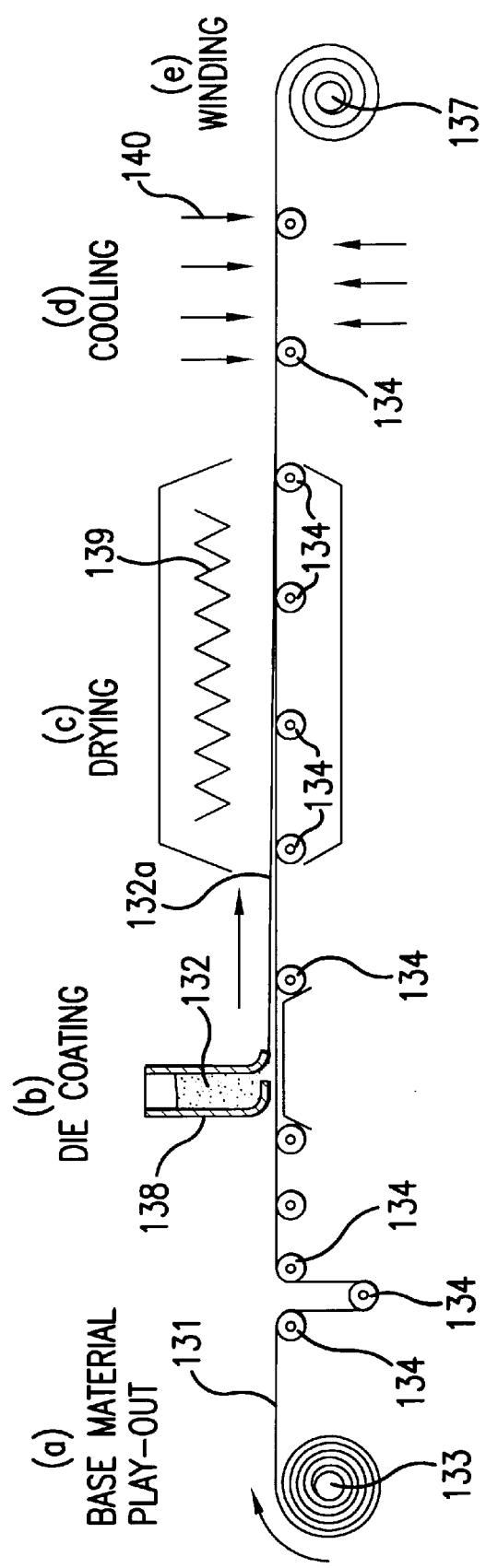
FIG. 13 is an early-stage flow chart illustrating the method for manufacturing a porous metal material in the sixth embodiment of the present invention.

FIG. 13 is a flow chart of the early-stage process in the method for manufacturing metal staple fibers. In this early-stage process, the flow goes through the steps of (a) base material play-out, (b) die coating, (c) drying, (d) cooling, and (e) winding, which results in one side (the side printed with the metal powder paint in the later-stage process) of a base material 131 composed of a PET film or other belt-form thin film or the like being continuously coated with a water-soluble adhesive 132 to form an adhesive thin film 132a.

Specifically, the base material 131 wound on the roll shaft 133 on the feed side is played out via guide rollers 134, and wound onto the roll shaft 137 on the winding side. In the course of the movement of this base material 131, one side of the base material 131 sent to the die coating step is coated with a polyvinyl alcohol (PVA) resin or other such water-soluble adhesive 132 that is metered out and sent from a coating container 138, thus forming the adhesive thin film 132a. The adhesive thin film 132a is heated by a heater 139 as it passes through the heating step, the water in the adhesive 132 is evaporated, and the film is hardened. This hardened adhesive thin film 132a is cooled by having cool air 140 blown against it in the cooling step, after which it is wound on the roll shaft 137.

Figure 14:
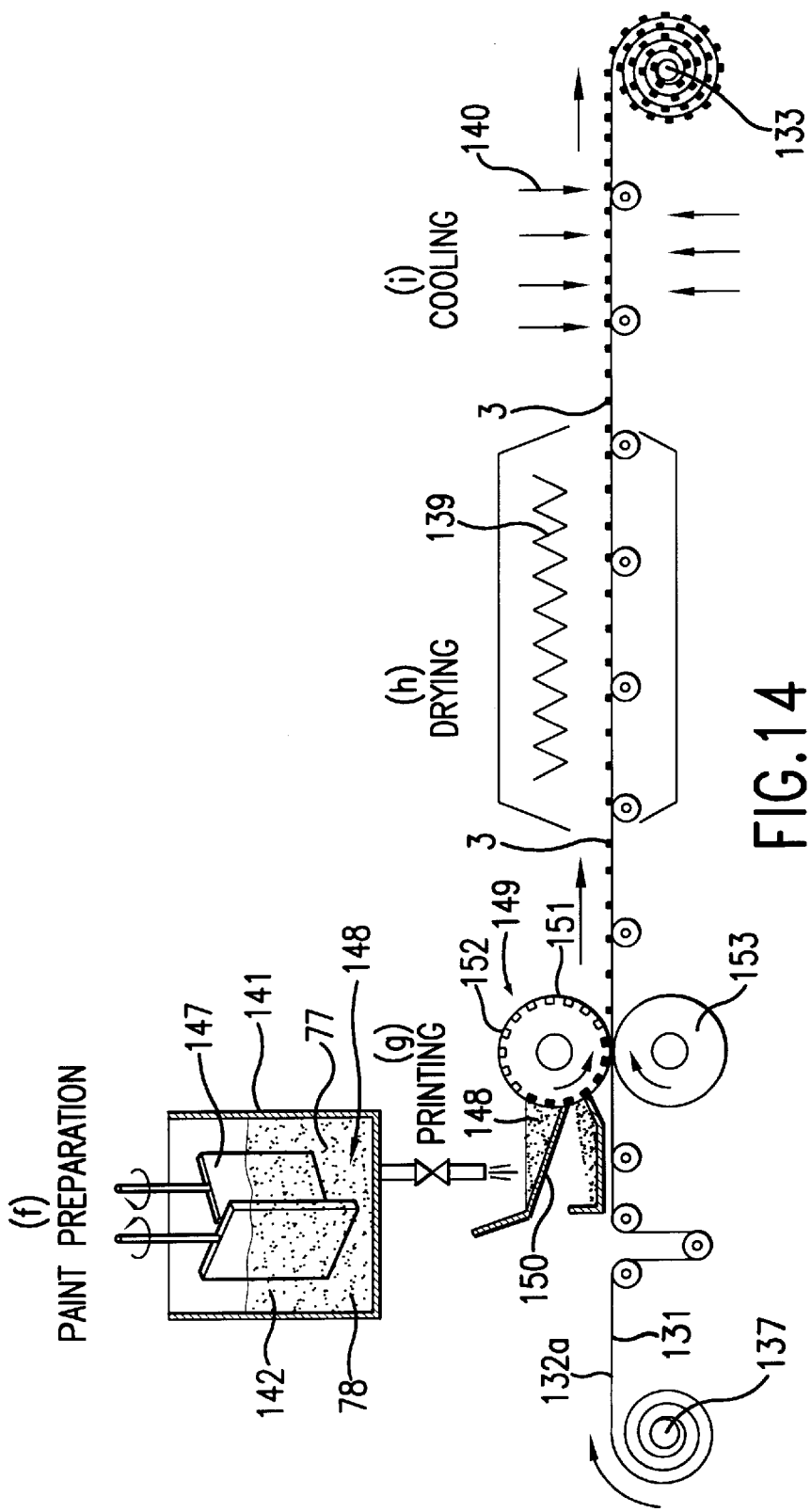
FIG. 14 is a middle-stage flow chart thereof.

FIG. 14 is a flow chart of the (f) paint preparation step, (g) printing step, (h) drying step, and (i) cooling step in the above manufacturing method. In the painting step, an organic solvent (isophorone) 142 is readied in a mixing tank 141, into which an oil-based binder resin 78, such as a phenol resin or butyral resin, and a metal powder 77, such as a nickel powder with an average particle diameter of approximately 3 μm, are admixed in a proportion of 3:1 to 1:1 (weight ratio). The binder resin 78 and the metal powder 77 are agitated by agitator blades 147 to disperse them in the solvent 142 and produce a metal powder paint 148.

Next, in the printing step, the metal powder paint 148 is supplied to the printing tray 150 of a gravure printing apparatus 149, and a rotating intaglio 151 is filled with the metal powder paint 148. A recessed pattern 152 in the form of short fibers having the required ultrafine fiber diameter is formed around the surface of the intaglio 151, and the metal powder paint 148 that fills this recessed pattern 152 is transferred and printed onto the adhesive thin film 132a of the base material 131 passing between the intaglio 151 and a receiving roll 153. In the drying step, this product is heated by a heater 139 to evaporate the isophorone that serves as the solvent 142, yielding metal staple fibers 3 in which the metal powder 77 in the metal powder paint 148 is bound via the binder resin 78. These metal staple fibers 3 are cooled by having cool air 140 blown against them in the cooling step, after which the base material 131 on which the metal staple fibers 3 have been formed is wound on the roll shaft 133.

Figure 15:
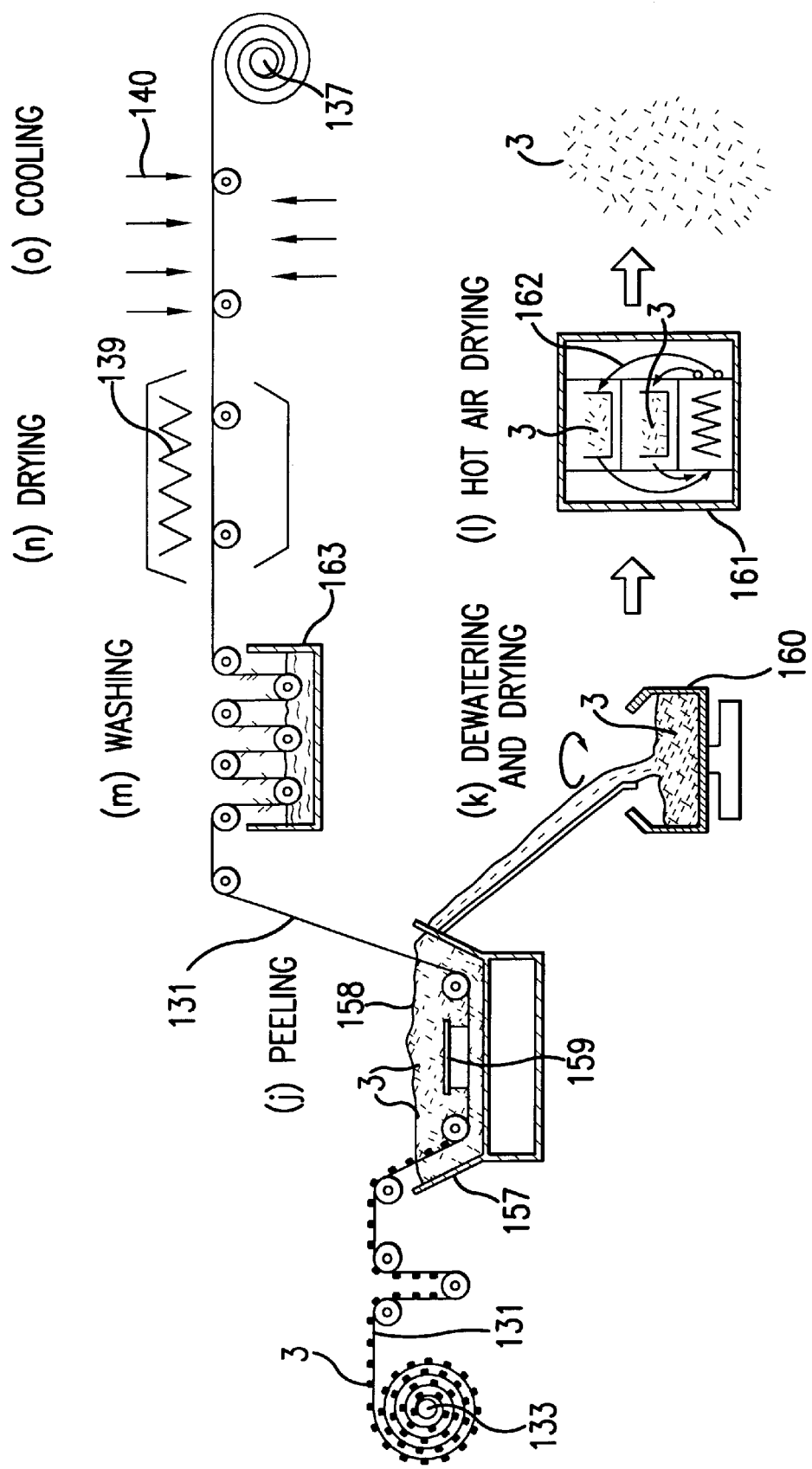
FIG. 15 is a later-stage flow chart thereof.

FIG. 15 is a flow chart of the (j) peeling step, (k) dewatering and drying step, (l) hot air drying step, (m) washing step, (n) drying step, and (o) cooling step in the above manufacturing method. The base material 131 that has the metal staple fibers 3 formed on one side is played out from the roll shaft 133 and passed through a treatment tank 157.

The treatment tank 157 is filled with water 158, and an ultrasonic oscillator 159 is installed at the bottom such that it is immersed in the water 158.

Therefore, when the base material 131 on which the metal staple fibers 3 have been formed is immersed in and passed through the water 158, the adhesive thin film 132a dissolves in the water 158, and the metal staple fibers 3 peel away from the base material 131. Furthermore, the ultrasonic oscillation promotes the dissolution of the adhesive thin film 132a in the water 158, and also promotes the dissolution and washing away of the adhesive adhering to the metal staple fibers 3, so the metal staple fibers 3 can be peeled away from the base material 131 highly efficiently. Here, since the binder resin 78 is oil-based and does not dissolve in the water 158, the binding of the metal powder 77 by this binder resin 78 is maintained, and there is no decomposition of the metal staple fibers 3.

The water 158 which contains the floating metal staple fibers 3 peeled away from the base material 131 is introduced into a dewatering tank 160, and the dewatering tank 160 is rotated at high speed. As a result, the water 158 is removed to the outside by centrifugal force, and only the metal staple fibers 3 are taken out. Hot air 162 is blown against these metal staple fibers 3 in a drying furnace 161, which further removes the water and yields the required metal staple fibers 3.

With this manufacturing method, since the metal powder paint 148 is printed onto the base material 131 in the required staple fiber form, metal staple fibers 3 with an extremely fine fiber diameter can be reliably obtained, and the length thereof will also be consistent. Furthermore, the productivity is markedly higher than with methods in which molten metal is extruded from the fine holes in a nozzle and other such methods, and mass production can be achieved with ease.

After the metal staple fibers 3 have been removed, the base material 131 is washed with water while passing through a washing tank 163 to remove any material adhering to the surface, after which it is heated and dried by a heater 139, and is then cooled by having cool air 140 blown against it, after which it is wound on the roll shaft 137. After being wound on this roll shaft 137, the base material 131 is reused in the play-out step in FIG. 13(a). This allows the manufacturing costs to be further reduced.

Figure 16A:
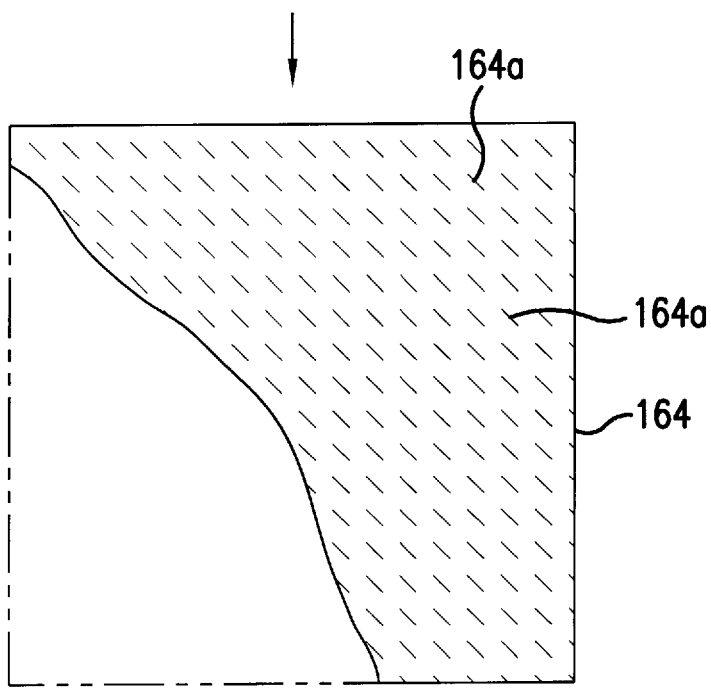
FIG. 16 illustrates a method for manufacturing metal staple fibers in another configuration.
Figure 16B:
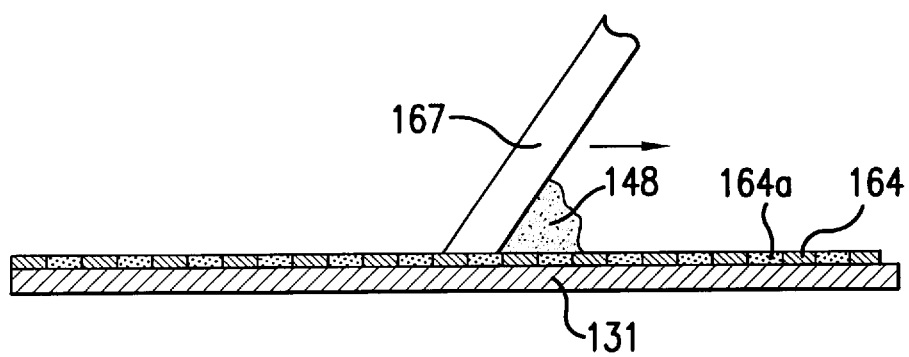
Figure 16C:
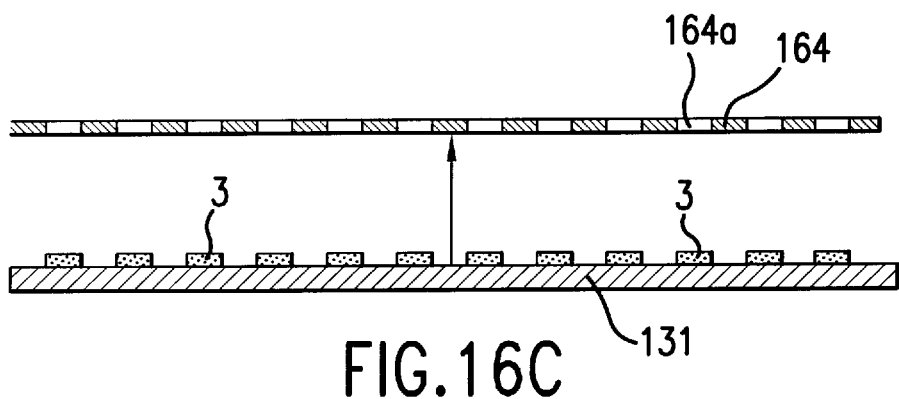

Gravure printing was described for the printing step in FIG. 14(g), but screen printing can also be used. Specifically, as shown in FIG. 16(a), a screen mask 164 is formed, on the surface of which are formed numerous patterns 164a in the form of staple fibers with a fine fiber diameter. As shown in FIG. 16(b), this screen mask 164 is set on the base material 131, and the base material 131 is coated with the metal powder paint 148 through this screen mask 164 using a squeegee 167. This product then goes through a drying step, which allows the formation of metal staple fibers 3 in the required fiber form over the base material 131.

Next, the method for obtaining a porous metal material using the metal staple fibers 3 obtained in the above manufacturing process will be described through reference to FIG. 17, which is a flow chart of this method. This process is used to manufacture a porous metal material that will serve as the core for a cell electrode sheet, using metal staple fibers 3 as the raw material, and pure metal is substituted for the metal staple fibers 3 in the course of producing this porous metal material.

In the paint mixing step (p), the water 158 is supplied as a solvent to a mixing tank 168, in which a binder 143 (which functions the same as the adhesive in the first to fifth embodiments) and the above-mentioned metal staple fibers 3 are mixed and dispersed to produce a slurry 170. Next, in the painting step (q), an extruder 171 is filled with the slurry 170, the metal substrate sheet 9 is passed through this, and the slurry 170 is extruded so as to coat both sides of the metal substrate sheet 9 in a uniform thickness. Then, in the alignment step (r), the sides coated with the slurry 170 are subjected to a magnetic field produced by ferrite magnets (orienting magnet components) 13 set up perpendicular to the coated sides, which orients the metal staple fibers 3 in the slurry 170 so that they are perpendicular with respect to the metal substrate sheet 9.

In the drying step (s), the above product is heated by the heater 139 to evaporate off the solvent water 158, and the metal staple fibers 3 and the metal substrate sheet 9 are mutually bonded and cured in a perpendicular state by the binder 143, after which, in the cooling step (t), the cool air 140 is blown against this product to cool it. Next, in the heating step (u), this product is heated and oxidized in an air atmosphere in the heating furnace 20, which binds the nickel, for example, in the metal staple fibers 3 with oxygen to produce nickel oxide, decomposes the binder 143, and begins the partial sintering of the metal powder 77 in the metal staple fibers 3. Finally, in the reduction step (v), this product is heated in a reductive gas, such as a mixed gas of hydrogen and nitrogen, in the reduction furnace 21, which binds the oxygen of the nickel oxide to the hydrogen to produce water, and sinters only the metal powder 77 to produce metal staple fibers 3 of pure metal. Also, the metal substrate sheet 9 and the metal staple fibers 3 are securely joined in a metallic state, resulting in the brush-like, high-porosity porous metal material 22 shown in FIG. 3.

As for the method for manufacturing the porous metal material 22 using the metal staple fibers 3 composed of the metal powder 77 and the binder resin 78 obtained in this embodiment, in addition to following the steps shown in FIG. 17, it is also possible to use, for example, the method given in the first embodiment illustrated in FIGS. 1 and 2, the method given in the second embodiment illustrated in FIG. 4, the method given in the third embodiment illustrated in FIG. 5, the method given in the fourth embodiment illustrated in FIG. 9, or the method given in the fifth embodiment illustrated in FIG. 12.

INDUSTRIAL APPLICABILITY

As described above, the use of the present invention as a core for an electrode sheet in a cell allows the simple and low-cost manufacture of a porous metal material which permits the efficiency of the active material to be increased.

What is claimed is:

1. A method for manufacturing a porous metal material, comprising the steps of:

utilizing a magnetic field to orient numerous metal staple fibers in a state of being generally perpendicular to a surface of a metal substrate sheet, said metal staple fibers comprising a mixture of a metal powder and a binder resin;

holding said metal staple fibers on the metal substrate sheet in the state in which said metal staple fibers are generally perpendicular thereto by means of an adhesive supplied to the metal substrate sheet;

removing said adhesive and said binder resin by pyrolysis; and integrally joining said metal staple fibers and metal substrate sheet by sintering.

2. A method for manufacturing a porous metal material as defined in claim 1, wherein the metal substrate sheet is in a form of a belt, said belt being continuously conveyed.

3. A method for manufacturing a porous metal material as defined in claim 1 or 2, wherein the adhesive is one of a resin solution and a metal powder-dispersed resin solution.

4. A method for manufacturing a porous metal material as defined in claim 1 or 2, wherein the metal staple fibers scattered on the metal substrate sheet are subjected to a demagnetization treatment prior to being scattered.

5. A method for manufacturing a porous metal material as defined in claim 1, wherein the metal staple fibers are produced by spinning.

6. A method for manufacturing a porous metal material as defined in claim 1, wherein the metal staple fibers are produced by spinning such that they contain the metal powder in an amount of about 30 to about 85 wt %.

7. A method for manufacturing a porous metal material as defined in claim 1, wherein the metal staple fibers are produced by spinning such that metal resin composite fibers containing the metal powder in an amount of about 40 to about 95 wt % are covered with a resin sheath layer.

8. A method for manufacturing a porous metal material as defined in claim 1, wherein the numerous metal staple fibers are integrally joined to both sides of the metal substrate sheet.

9. A method for manufacturing a porous metal material as defined in claim 1, wherein the metal staple fibers are produced by the steps of:

kneading the metal powder and the binder resin to produce the mixture;

extruding and forming the mixture to create a metal-resin composite fiber; and winding the metal-resin composite fiber onto a winding roll.

10. A method for manufacturing a porous metal material as defined in claim 9, wherein the metal-resin composite fibers have a fiber diameter in a range of about 10 to about 300 μm.

11. A method for manufacturing a porous metal material as defined in claim 9, wherein the metal-resin composite fibers have a fiber diameter in a range of about 30 to about 200 μm.

12. A method for manufacturing a porous metal material as defined in claim 9, further comprising:

intermittently pulling out an amount of the metal-resin composite fiber from the winding roll; and cutting the metal-resin composite fiber to a selected length to form the metal staple fibers.

13. A method for manufacturing a porous metal material as defined in claim 12, wherein said selected length is in a range of about 0.5 to about 5 mm.

14. A method for manufacturing a porous metal material as defined in claim 1, wherein the metal staple fibers are produced by the steps of:

playing out a base material;

coating said base material with a water-soluble adhesive;

mixing a metal powder with an oil-based binder resin to produce a metal powder paint;

printing said base material with said metal powder paint in a form of short fibers having a desired diameter; and winding said base material with said short fibers of metal powder paint affixed thereto on a roll shaft.

15. A method for manufacturing a porous metal material as defined in claim 14, further comprising:

playing out the base material with said short fibers of metal powder paint affixed thereto from the roll shaft;

dissolving said water-soluble adhesive by exposure to water such that said metal staple fibers are liberated from the base material and washed clean of the water-soluble adhesive.

16. A method for manufacturing a porous metal material as defined in claim 14, wherein said step of printing includes gravure printing in which a rotating intaglio includes a recessed pattern corresponding to said short fibers which are filled with the metal powder paint.

17. A method for manufacturing a porous metal material as defined in claim 14, wherein said step of printing includes screen printing.

* * * * *